Figure 1:
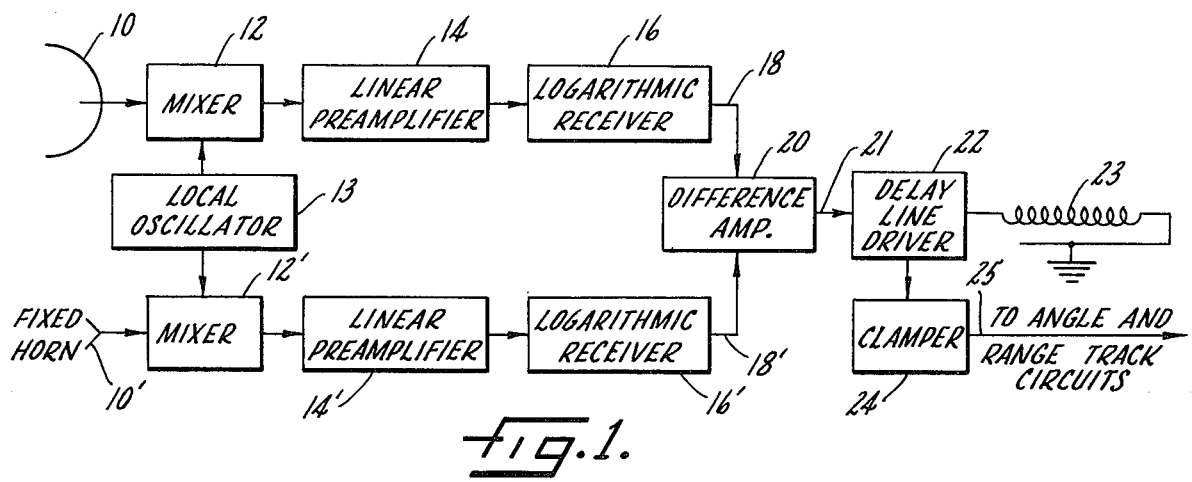

United States Patent [19]
Carnahan et al.

[11] 3,947,848
[45] Mar. 30, 1976

[54] ANTI-JAM DUAL CHANNEL VIDEO CANCELLATION CIRCUIT FOR FIRST TARGET TRACKING SYSTEM

[75] Inventors: Samuel U. Carnahan, Chadd's Ford, Pa.; Robert N. Longuemare, Jr., Halethorpe, Md.

[73] Assignee: The United States of America as represented by the Secretary of the Navy, Washington, D.C.

[22] Filed: Aug. 7, 1962

[21] Appl. No.: 215,473

[52] U.S. Cl. ............................................. 343/18 E
[51] Int. Cl.² ............................................. G01S 7/36
[58] Field of Search ............ 343/18, 17.1, 7.3, 18 E; 325/324, 485, 475, 44

[56] References Cited
UNITED STATES PATENTS 3,021,523  2/1962  Davis et al. ............................ 343/18
3,167,761  1/1965  Le Parquier ..................... 343/18 E X FOREIGN PATENTS OR APPLICATIONS
720,345  12/1954  United Kingdom ................ 343/17.1

Primary Examiner—T. H. Tubbesing
Attorney, Agent, or Firm—R. S. Sciascia; Paul S. Collignon

[57] ABSTRACT

This invention relates to anti-jam radar circuitry and more particularly to a dual channel video cancellation circuit for removing the power advantage of a jamming signal compared to a target echo signal, and to a delay line and clamper circuit to provide cancellation of signal for a duration at least equal to the system pulse width for a period immediately following the trailing edge of a true target echo signal.

9 Claims, 7 Drawing Figures

(21) DIFFERENCE OUTPUT

ANTI-JAM DUAL CHANNEL VIDEO CANCELLATION CIRCUIT FOR FIRST TARGET TRACKING SYSTEM

BACKGROUND OF THE INVENTION

The use of radar and particularly pulsed radar systems for range and angle tracking of target objects have proved heretofore to be the best means of tracking enemy objects. Such pulsed radar systems, however, are vulnerable to electronic countermeasures (ECM) of enemy repeater radars which foils own radar system. The transmission of pulses from own radar to range upon or angle track an enemy object carrying a repeater countermeasure radar system enables the enemy radar to pick up each transmitted pulse and send it back to own radar at high power to cause the tracking gates of own radar to follow this higher power false echo pulse. The enemy repeater radar system thereafter produces a progressively increasing delay in the repeated pulses which causes the range tracking gate of own radar to be pulled away from the actual target and on to a decoy signal. Consequently, own radar is caused to track a false signal which will produce a target indication far removed from the actual target whereupon own radar becomes useless in tracking the enemy object. Anti-jam circuits therefore become essential to a range and angle tracking radar system to guard against the deceptive repeated jamming signals of an ECM repeater radar system.

In the present invention it is recognized that two things must be accomplished to nullify the effects of ECM radar equipment:

First, the system must remove the power advantage of the jamming signal compared to the target echo signal, and Second, the system must provide a cancellation signal of duration at least equal to the system pulse width and of amplitude at least equal to the reduced jamming signal. The cancellation signal must occur in time immediately following the trailing edge of the true target echo signal.

SUMMARY OF THE INVENTION

These are accomplished in the present invention by using main and auxiliary receiver channels from main and auxiliary fixed antenna horns. The main and auxiliary receiver channels include logarithmic receivers each of which produces a voltage proportional to the logarithmic function of received signals, the voltage from the auxiliary receiver channel being subtracted from the voltage from the main receiver channel in a difference circuit producing an output that eliminates the power advantage of any jamming or interference signal. The output of the difference circuit is applied to a delay line and through a clamper network to the angle and range tracking circuits of own radar, this delay line and clamper circuit producing the cancellation of any and all signals for a signal pulse width following each true target echo to nullify the possibility of even an equal amplitude jamming signal from pulling the range gate circuits from the true target echo signal. It is therefore a general object of this invention to provide an anti-jam dual channel video cancellation circuit for a pulsed type range and angle tracking radar system that is immune to deceptive jamming signals to an enemy ECM repeater radar system.

Figure 2:
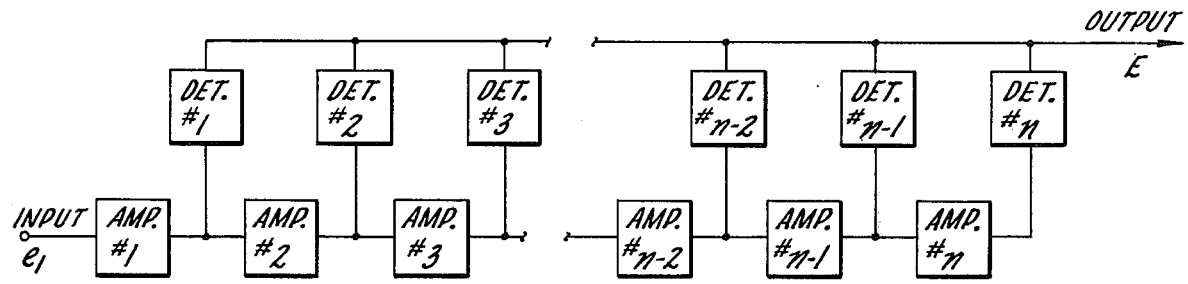
Figure 4:
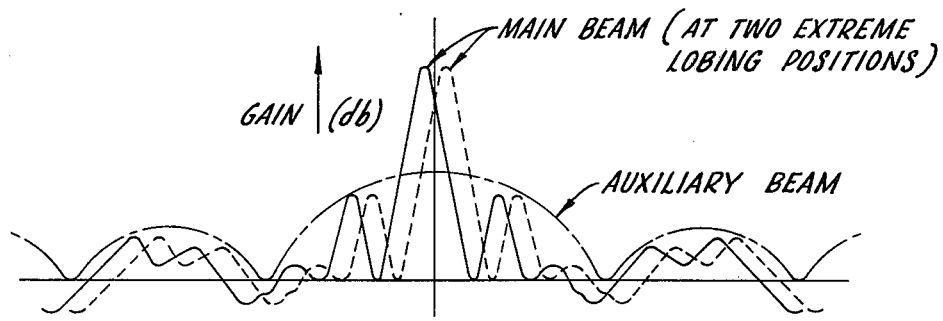
Figure 3:
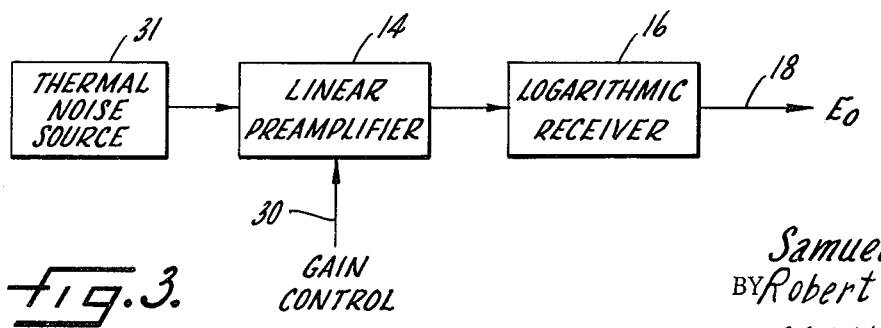
Figure 5:
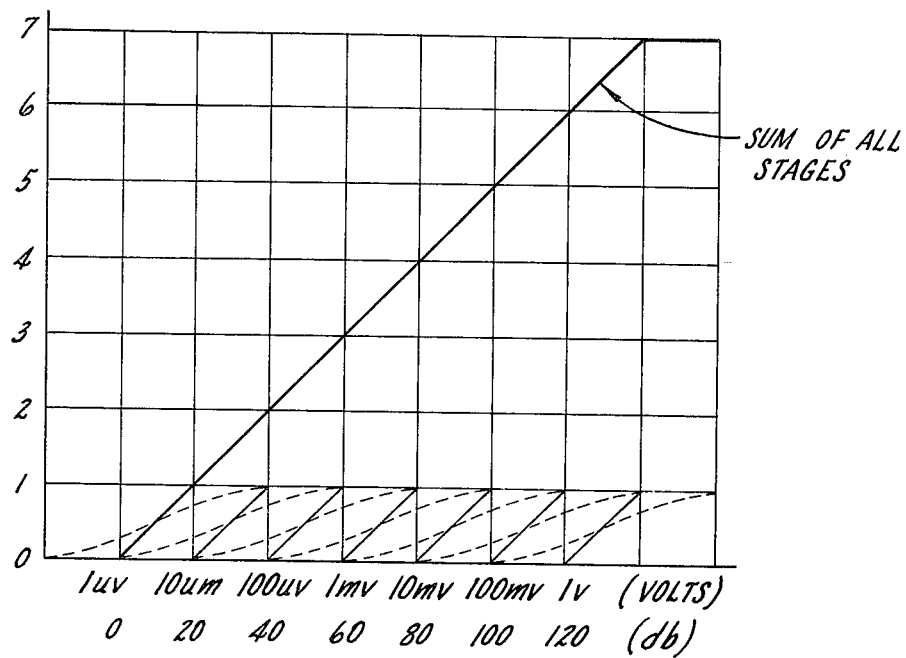
Figure 6:
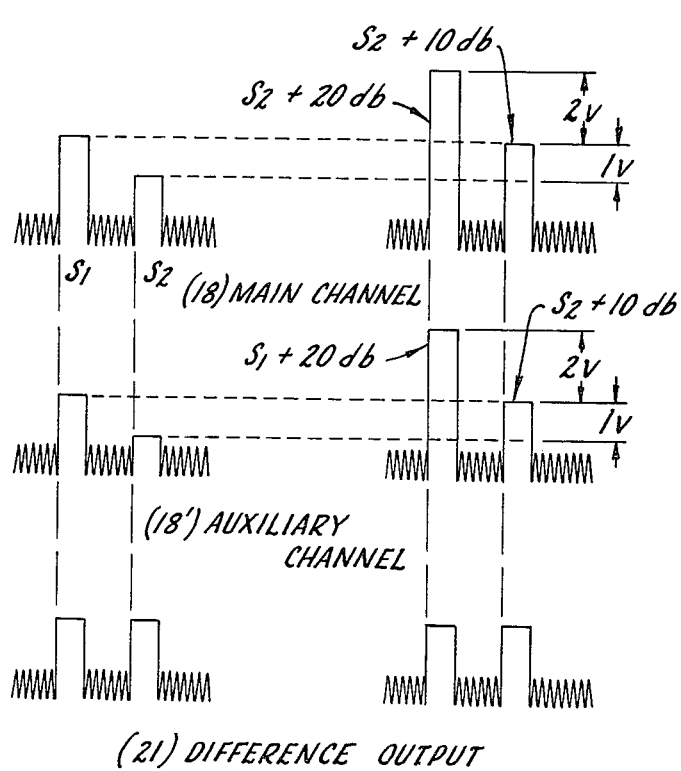
Figure 7:
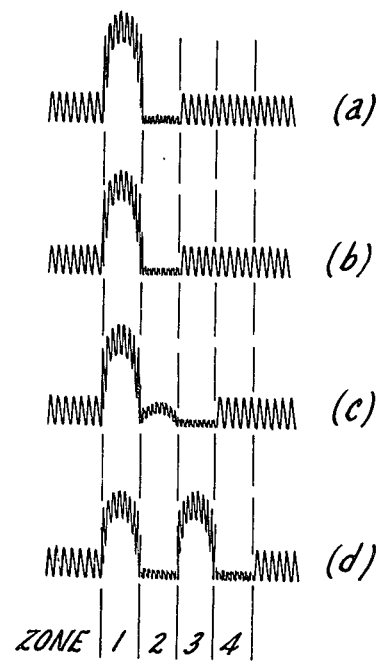

These and other objects and the attendant advantages, features, and uses will become more apparent to those skilled in the art as the description proceeds with reference to the several figures of drawing providing workable examples of the invention in which:

FIG. 1 is a block circuit diagram of a preferred example of the invention,

FIG. 2 is a block circuit diagram of one of the block circuit components illustrated in FIG. 1, FIG. 3 is a block circuit diagram of another of the block circuit components in FIG. 1, FIG. 4 is power distribution wave pattern of the main and auxiliary antenna beams, FIG. 5 is a characteristic chart of the logarithmic receiver illustrated in FIG. 2, FIG. 6 illustrates examples of target echo and jamming signal waveforms, and FIG. 7 illustrates the idealized waveforms at the output of the system of this invention.

Referring more particularly to FIG. 1 of the drawings, a main antenna 10 is illustrated as being coupled to a mixer 12 which has oscillations mixed from a local oscillator 13 therewith to produce intermediate frequency (IF) for the IF stages of the receiver. The IF stages include a linear preamplifier 14 and a logarithmic receiver 16, the output of which is over the conductor means 18. The antenna 10, mixer 12, preamplifier 14, and logarithmic receiver 16 constitute the main receiver channel of this system. An auxiliary fixed antenna 10' is coupled to a mixer 12' which is fed beat frequency from the local oscillator 13. The mixer produces on its output the IF which is applied through a linear preamplifier 14' and a logarithmic receiver 16' to an output conductor 18'. The mixers, linear preamplifiers, and logarithmic receivers may be identical in both channels and, accordingly, are identified by the principal reference characters in the main receiver channel and by the same reference characters primed in the auxiliary receiver channel for a ready recognition of the similarity of the two channels. The main antenna 10 is the normal high gain parabolic type having conical scanning and a pencil beam. The auxiliary antenna 10' is a fixed antenna horn for a lower gain and a wider beam width than the main antenna 10. Hence, for any signal appearing in the main beam of the main antenna 10, the same signal in the auxiliary channel is smaller by a fixed ratio. To realize the full anti-jam advantages of this system, angle tracking considerations dictate that the auxiliary antenna gain at any angle off beam center is at least as great as the gain of the main antenna in that direction.

The linear preamplifiers are of well-known and conventional design but must have a linear dynamic range which is equal to that of the logarithmic receivers and of sufficient gain to raise the receiver thermal noise to the level where the logarithmic operation takes place in the logarithmic amplifiers of the logarithmic receiver soon to be described. Since the bandwidth of the logarithmic amplifiers in the logarithmic receivers increases with an increase of signal amplitude, the overall receiver bandwidth should be determined in the preamplifiers or in an associated bandwidth switching unit.

The function of each logarithmic amplifier is to provide an output voltage proportional to the input signal-to-noise ratio. Except for a scale-factor difference, the output voltage is a measure of the input signal-to-noise ratio in decibels (db). For practical reasons the logarithmic characteristic is mechanized over a restricted range of input signal-to-noise ratios. For voltage inputs below a specific level the receiver operates as a conventional linear amplifier, and hence requires that the system noise voltage be amplified at least to this minimum level for proper operation. The non-linear gain characteristics required of the logarithmic receiver may be obtained by a suitable number of straight line approximations to the logarithmic curve. At radar IF frequencies one of the most practical methods of achieving this is by the use of a successive detection amplifier soon to be described with reference to FIG. 2. For the purpose of completing the description of FIG. 1 let it be assumed that the logarithmic receivers 16 and 16' produce the respective logarithmic voltage output on the output conductors 18 and 18' from the main and auxiliary receiver channels. The output of 18 and 18' are conducted to a difference amplifier 20 in which the logarithmic voltage output from the auxiliary receiver channel over the output conductor 18' is subtracted from the logarithmic voltage output over conductor 18 from the main channel in a difference amplifier 20.

Because the output of each IF channel is proportional to the logarithm of the channel signal-to-noise ratio, a method of canceling input power variations is available. The signal-to-noise ratio (S/N) in the main channel is greater than that of the auxiliary channel by a fixed ratio equal to the difference in antenna gains since the noise figure of each channel is made very nearly equal by using identical preamplifiers 14 and 14'. If the S/N ratio in the main channel is divided by that of the auxiliary channel, then the result would be a constant as shown in the following:

Let
$S$ = signal field strength
$S_m$ = signal in main channel
$S_a$ = signal in auxiliary channel
$N$ = system noise level
$G_m$ = gain of main antenna
$G_a$ = gain of auxiliary antenna
Then $$S_m = G_m S \quad \text{and} \quad \frac{S_m}{N} = G_m (S/N)$$

$$S_a = G_a S \qquad \frac{S_a}{N} = G_a (S/N)$$

The ratio $R$ of signals out of each channel is thus $$R = \frac{S_m/N}{S_a/N} = \frac{G_m (S/N)}{G_a (S/N)}.$$

Hence, $$R = \frac{G_m}{G_a} \quad (R \text{ being a constant}) \qquad (1)$$

From this it is seen that the ratio of the signls out of each channel is independent of the input signal amplitude, and depends only on the antenna gain difference. Thus, if this ratio of signals could be utilized instead of the absolute value of the signal, the resulting output would be the same for all signal strengths.

This ratio is obtained in the disclosed system by using logarithms for computation. If the log of equation (1) is taken, the result is $$\log R = \log \frac{S_m/N}{S_a/N}.$$

$$\log R = \log (S_m/N) - \log (S_a/N) \qquad (2)$$

The two quantities on the right side of equation (2) are precisely the outputs of the two logarithmic amplifiers, so that the desired ratio can be obtained by merely subtracting one signal from the other.

The difference signals for both received interference or jamming signals and true target echo signals being of equal amplitude may be sufficient to prevent range gate stealing. But to overcome possible conditions arising from unbalance in range tracking circuits of own radar or certain aircraft maneuvers of an aircraft carrying own radar, a delay line driver 22 and a clamping circuit 24 are coupled between the output 21 of the difference amplifier 20 and an output conductor 25 adapted to be connected to the angle and range tracking circuits (not shown) of own radar system. The delay line driver 22 is short circuited to ground through a delay line 23 and has a delay equal to the transmitted pulse width. The delay line driver 22 and delay line 23 produce an inversion of the delayed pulse which is reflected back to the clamper circuit 24 making a pulse equal in amplitude to the incident pulse but opposite in polarity and delayed by a pulse width which inverted reflected pulse, or negative pulse, is clipped or clamped by the clamper network 24. In this manner each input pulse to the delay line reflects a pulse of opposite polarity and of nearly equal amplitude such that, when a jamming signal is timed coincident with a target, it merely augments the received target echo; but when a jamming pulse is received that is delayed from the true target echo by one pulse width, it is completely cancelled by the true target echo which has been reflected through the delay line. Consequently, the jamming pulse of equal amplitude is completely cancelled for a full pulse width following the true target echo pulse and is accordingly ineffective to lock on or steal the range gate of the range angle and target tracking system.

Referring more particularly to FIG. 2 there is shown a successive detection logarithmic amplifier using N stages identical in design and with a stage gain of G. A signal of level $e_1$ is chosen such that the last detector N gives an output of $E_1$. If the input is increased to G times its original value the next to last detector will not be operating under the conditions at which the last detector was originally operating and will have an output of $E_1$. Also, if the original input signal level $e_1$ was reasonable, the last detector will now be operating under the conditions at whicih the last detector was originally operating and will have an output of $E_1$. Also, if the original input signal level $e_1$ was reasonable, the last detector will now be operating at saturation and will have an output $E_s$. Since the detector outputs are added linearly, the receiver output will be $E_s + E_1$. By similar reasoning, for another increase in input to $G^2 e_1$, the output will increase to $2E_s + E_1$ or, in the general case, for an input signal ($e = G^n e_1$) the output signal will be ($E = nE_s + E_1$). This is the desired logarithmic response produced on the outputs 18 and 18' of the logarithmic receivers 16 and 16'. It can be shown mathmetically that the root means square (RMS) output of a logarithmic receiver is independent of the RMS value of desired input assuming the input to be white Gaussian noise and that the logarithmic characteristic is ideal. The average value of the noise does change, however, and appears as a direct current shift at the output of the logarithmic receiver.

Referring more particularly to FIG. 3 with the gain $G$ equal to zero by adjustment of the gain control 30 on the linear amplifier 14, no noise will appear at $E_o$ on the output 18 of the logarithmic receiver 16. The same would be true for the linear preamplifier 14' and logarithmic receiver 16' through the output 18' in the auxiliary channel. As $G$ increases, the noise from the thermal noise source 31 will increase on the output 18 at $E_o$ linearly with $G$ until the logarithmic portion of the logarithmic receiver 16 is reached. When the logarithmic portion is reached, the RMS value of noise at $E_o$ will remain constant for any further increase of $G$. If operation occurs on the logarithmic curve, a change in gain of the preamplifier will have no affect on the RMS output, the RMS output being determined uniquely by the slope (volts/db) of the logarithmic receiver. This simplifies mechanization since the radar frequency gain of one channel in the system does not have to be identical with the gain of the other channel for precise subtraction of the video signal. The slopes of the logarithmic amplifiers and not the gain of the preamplifiers determine system accuracy.

To demonstrate a little more clearly that the accuracy of this system depends upon the slope characteristics of the logarithmic receivers 16 and 16' and is independent of the preamplifier (14 or 14') gain or direct current output of the receiver, reference is made to FIG. 5. This figure shows an idealized and simplified characteristic of each stage as well as the resultant from summing the detected outputs. Each stage characteristic is illustrated in dashed lines and overlap to an extent such that there are at least two or three stages contributing slope to the output characteristic. This is simplified for purposes of explanation by the illustrated solid line. Let it be assumed that the output $E_o$ of FIG. 3 is such that the output of the logarithmic receiver 16 lies between 2 and 3 along the summing line of all stages in FIG. 5. This is a change of 1 unit in FIG. 5. This represents the RMS input which lies between 100 microvolts and 1 millivolt. Increasing the preamplifier gain by some arbitrary factor, say 100 times, will position the input between 10 millivolts and 100 millivolts. In FIG. 5 an output will occur between 4 and 5, a change of still only 1 unit. Any difference in direct current levels between the two channels may be easily removed by capacitor coupling. A preamplifier is used ahead of the logarithmic receiver to amplify receiver thermal noise to the point where RMS fluctuations of the noise fall on the logarithmic portion of the logarithmic amplifier. This ensures that any signal appearing above thermal noise will be on the logarithmic portion of the receiver curve.

The system thus described prevents the operation of any high amplitude jamming signal or other interference signal from producing deceptive signals in the IF circuitry of the receiver to cause stealing of the range gates in the part of the radar system not shown herein. The manner in which this is accomplished may best be understood by a description of operation.

OPERATION

In the operation of this device reference is made to the several figures and particularly to the FIGS. 4, 6, and 7 providing illustrated examples of radar antenna patterns and probable received signals. Let it be assumed that the main and auxiliary antennas 10 and 10' produce antenna wave patterns as shown in FIG. 4 wherein the main beam is illustrated in its extreme positions, one in solid line and the other in broken line, illustrating the high amplitude and narrow bandwidth of the main antenna 10. The auxiliary beam is illustrated by a dot-and-dash line which shows its lower amplitude and wider beam width relative to the main beam. As illustrated in FIG. 6, strong and weak echo signals S1 and S2 are shown as they would appear at the points indicated by the reference characters 18, 18' and 21 in the circuit of FIG. 1. The signals S1 and S2 are shown of greater amplitude in the main channel output 18 than that at auxiliary channel output 18' by virtue of the difference in gain of the main and auxiliary antennas 10 and 10'. Upon subtraction of the signals on 18' from the signal on 18 in the difference amplifier 20, the output signals on the output 21 from the difference amplifier are of equal amplitude as shown. The extent to which a signal appears above receiver noise is a function of antenna gain. Let it also be assumed that the larger echo is increased at the antenna inputs by 20 db and the weaker echo is increased by 10 db. Using FIGS. 5 and 6, these signals can be traced through the two receiver channels. For simplicity, assume that each logarithmic receiver has a scale factor of 0.1 volt/db change in S/N ratio. The larger echo will increase by 2 volts at both the main and auxiliary channel outputs since the db increase is equal in both channels. Similarly, the weaker echo increases by 1 volt on the output of each channel, corresponding to 10 db increase in input level. If now the auxiliary channel output is subtracted from that of the main channel output, the resulting amplitude of the video difference pulses at 21 corresponding to the strong and weak echo pulses are equal. In addition, after the larger echo signal is increased by 20 db and the smaller echo signal is increased by 10 db the two sets of pulses after subtraction are still equal in amplitude as before the input signals were increased. As would be expected, this constant amplitude level of the difference signal output at 21 is only a function of antenna gain differential between the two channels. The difference output at 21 to the delay line driver 22 therefore will always be of equal amplitude and accordingly, provide at this point signals which are substantially ineffective to produce range gate stealing because jamming signals have no greater power than true target echo signals to give the jamming signals an advantage of controlling the range gate positions.

Referring more particularly to FIGS. 1 and 7, when the difference signals, such as those shown in FIG. 6 (21), are applied to the delay line driver 22, each signal will pass through the delay line driver 22 to the clamper 24 and at the same time this signal will be reflected in the delay line 23 and inverted to produce the signal in one polarity and another signal in opposite polarity one full width in time later to the clamper network 24. The clamper network 24 will clip or clamp the delayed signal to substantially zero such that only the original positive output signal will be conducted on the output circuit 25 to the angle and range tracking circuit of the radar system. Idealized waveforms at the output 25 are shown in the series of waveforms (a) through (d) of FIG. 7. FIG. 7(a) illustrates the normal appearance of a target from a single pulse, shown in zone 1, the effects of the delay line and clamper network being shown in zone 2 following this single pulse. FIG. 7(b) represents a target which is being tracked with the added pulse from a range gate stealer or from ECM enemy radar. Due to a dual channel video cancellation system described hereinabove for FIG. 1, the amplitude of this video signal will not be altered regardless of jammer power. If the pulse from the range gate stealer of the ECM radar moves out in range, it is rapidly attenuated as shown in FIG. 7(c). When the ECM pulse which is the same size as the target (it can be greater only when the echo is not strong enough to appear in the auxiliary channel) is added to the negative half of the bi-polar video, the resultant output is substantially zero. Addition of the interfering or ECM signal with the target echo signal occurs at the delay line terminal. If we assume that the interfering or ECM pulse is equal in width and delayed one pulse width from our transmitted pulse, it can be seen in zone 2 of FIG. 7(c) that the interfering pulse is positive but is added to the reflected negative pulse of the target signal to produce nearly zero amplitude. In zone 3 of FIG. 7(c) the delay line output is a negative reflected interfering pulse which is clamped. The ECM pulse again appears the same size as the target when it is more than two pulse widths away from the target as illustrated in FIG. 7(d). Accordingly, it may be seen that ECM or interfering jamming signals are rendered ineffective to lock on and pull the range gates of own radar system away from true target echo position by virtue of being blanked out for a full pulse width following the true target pulse position. A pulse type radar system incorporating the circuit shown and described in this invention will accordingly be immune from jamming signals of ECM enemy repeater radars and will be able to maintain range and angle tracking of the target despite the reception of high power jamming signals.

It should be pointed out that the circuit of this invention incorporated in a pulse type radar system will not prevent gate stealing when the range gate stealer pulse is moved in the direction of decreasing range. However, this deficiency can be overcome by using a jittered pulse repetition frequency which is already incorporated in about all of the modern pulse radar systems. A pulse radar system utilizing the circuit of this invention is also immune to angle deception jammers or the combination of angle deception and gate stealing types. It will not acquire or track a pulse repeater in the side lobes. Interference signals such as altitude line and mutual interference is cancelled and will not appear on an indicator. Since the horn of the main beam antenna is nutating, its gain pattern changes with rotation and so provides two-way modulation on main channel echoes. The auxiliary horn being fixed receives only one-way modulation. Subtracting the video signals results in a difference signal with a one-way modulation, used for angle track information. Thus the system is sensitive to "positional" modulation (antenna pattern movement) of a signal but is immune to amplitude modulation of the signal from a given position. It is this property that defeats the angle deception repeater radar.

While many modifications and changes may be made in the constructional details and features of this invention to adapt the radar system for different types and applications, it is to be understood that we desire to be limited in the construction and functions of our invention by the scope and spirit of the appended claims.

We claim:

1. A dual channel video cancellation anti-jam circuit of a radar tracking system comprising:

a high gain, narrow beam antenna;

a low gain, wide beam antenna;

a logarithmic receiver channel coupled to each antenna to produce logarithmic functions of received signals on outputs thereof;

a difference circuit coupled to receive the output of both logarithmic receiver channels to subtract the logarithmic function of the signals from the low gain antenna from those of the high gain antenna to produce a difference signal output;

a delay line coupled to said difference circuit output to produce delayed signals on an output thereof; and a clamper circuit coupled to said delay line output to clamp said delayed signals at a predetermined voltage whereby desired echo signals and interference signals received are equalized in amplitude on the output of said difference circuit and the output of said clamper circuit prevents an interfering signal from appearing one pulse width from a desired echo signal thereby preventing signals to appear that could steal the range gates of a radar system.

2. A dual channel video cancellation anti-jam circuit as set forth in claim 1 wherein said logarithmic receiver channels each include a mixer and a linear preamplifier in the channel between said antenna and the receiver, said mixers being applied a mixing frequency by a local oscillator in common thereto.

3. A dual channel video cancellation anti-jam circuit as set forth in claim 2 wherein said linear preamplifier in each channel has a gain sufficient to raise the signal level to the range of logarithmic operation in the logarithmic receivers.

4. A dual channel video cancellation anti-jam circuit as set forth in claim 3 wherein said logarithmic receivers each include a plurality of logarithmic amplifier and detector stages operative over the logarithmic curve of the amplifier whereby increased gain does not further increase the root means square value of noise signals.

5. A dual channel video cancellation anti-jam circuit of a radar first target tracking system comprising:

a main antenna of high gain and narrow beam width;

an auxiliary antenna of low gain and wide beam width;

a mixer, a linear preamplifier, and a logarithmic receiver, in that order in each of two channels, coupled to each antenna to produce a logarithmic function output signal in each channel from each received signal;

a difference amplifier coupled to the output of each logarithmic receiver to subtract the logarithmic function signal received through the auxiliary antenna from the logarithmic function signal received through the main antenna to produce difference signals, said difference signals being of equal amplitude for varying amplitude signals received; and means coupled to receive said difference signals to produce delay signals one pulse width following said difference signals and to clamp said delayed signals at a fixed potential in negative polarity whereby interference signals intended to jam are cancelled and desired echo signals of a target are conducted through the dual channels to prevent the interference signals from jamming the radar tracking system.

6. A dual channel video cancellation circuit as set forth in claim 5 wherein
said mixer in each channel is coupled to a common local oscillator for providing a beat frequency thereto; and
said linear preamplifiers each provide a gain to signals conducted therethrough to raise them to voltage levels for application to the respective logarithmic receiver for amplification and detection over the logarithmic characteristic curve of said receivers to produce said logarithmic function output signals.

7. A dual channel video cancellation circuit as set forth in claim 6 wherein
said means is a short circuited delay line network and a clamper network coupled in that order from said difference amplifier to an output to produce a delay of each applied signal one pulse width which is clamped at a fixed potential by said clamping network to produce a substantially zero amplitude signal for one pusle-width following a desired echo signal.

8. A dual channel video cancellation anti-jam circuit of a radar first target tracking system comprising:
a main antenna of high gain and narrow beam width;
an auxiliary antenna of low gain and wide beam width;
a mixer, a linear preamplifier, and a logarithmic receiver coupled in that order from each antenna to an output, forming two channels to produce a logarithmic function output signal in each channel from each simultaneously received echo signal and interference jamming signal;
a difference amplifier coupled to the output of each channel to subtract the logarithmic function signal received through the auxiliary antenna from the logarithmic function signal received through said main antenna to produce difference signals of echo and interference jamming signals, said difference echo signals being of equal amplitude with said difference interference jamming signals;
a delay line coupled to receive the difference output of echo and interference signals from said difference amplifier to pass said difference signals as well as to delay and invert said signals a pulse width thereof following each said difference signal; and
a clamper network coupled to said delay line to clamp said delayed and inverted signals at substantially zero potential whereby interference jamming signals coincident with or following an echo signal are cancelled and ineffective to saturate or steal the target tracking gates of the target tracking system.

9. A dual channel video cancellation anti-jam circuit as set forth in claim 8 wherein
said logarithmic receiver includes a plurality of stages of logarithmic amplifiers and detectors to produce said logarithmic function signals.

* * * * *

UNITED STATES PATENT OFFICE
CERTIFICATE OF CORRECTION

PATENT NO. : 3,947,848

DATED : March 30, 1976

INVENTOR(S) : SAMUEL U. CARNAHAN and ROBERT N. LONGUEMARE, JR.

It is certified that error appears in the above--identified patent and that said Letters Patent are hereby corrected as shown below:

Column 4, line 48, change "not" to -- now --

Column 4, lines 51 through 54 delete "Also, if the original input signal level $e_1$ was reasonable, the last detector will now be operating under the conditions at which the last detector was originally operating and will have an output of $E_1$."

Signed and Sealed this

Thirteenth Day of July 1976

[SEAL]

Attest:

RUTH C. MASON
*Attesting Officer*

C. MARSHALL DANN
*Commissioner of Patents and Trademarks*